United States Patent [19]

Sack

[11] Patent Number: 4,609,632

[45] Date of Patent: Sep. 2, 1986

[54] GLASS COMPOSITIONS WITH LOW DIELECTRIC LOSSES

[75] Inventor: Werner Sack, Mainz, Fed. Rep. of Germany

[73] Assignee: Schott Glaswerke, Mainz, Fed. Rep. of Germany

[21] Appl. No.: 765,487

[22] Filed: Aug. 14, 1985

[30] Foreign Application Priority Data

Aug. 14, 1984 [DE] Fed. Rep. of Germany ....... 3429847

[51] Int. Cl.$^4$ ............... C03C 3/108; C03C 3/105; C03C 3/118
[52] U.S. Cl. .................... 501/61; 501/59; 501/62
[58] Field of Search ............. 501/59, 61, 62

[56] References Cited

U.S. PATENT DOCUMENTS 2,469,867  5/1949  Danzin ................................ 501/61
4,501,819  2/1985  Yatsuda et al. ..................... 501/61

*Primary Examiner*—Mark L. Bell
*Attorney, Agent, or Firm*—Millen & White

[57] ABSTRACT

Alkali-free glasses with low dielectric losses, thermal expansion coefficients of 3.15 to $4.97 \times 10^{-6}/°C$. in the temperature range from 20° to 300° C., adequate acid resistance, dielectric loss factors tan $\delta$ of 3.94 to $24.9 \times 10^{-4}$ and processing temperatures ($V_A$) of 1132° to 1280° C., have the following composition (in weight percent): 52.50–60.20 $SiO_2$, 2.80–3.80 $B_2O_3$, 8–14 $Al_2O_3$, 6.0–20.20 PbO, 2.0–13.5 CaO, 0–3.5 MgO, 0–8 ZnO, 0–4.7 BaO, $\Sigma$PbO, CaO, MgO, ZnO, BaO 21.10–34.0, 0–1.0 F, 0.20–0.50 $Sb_2O_3$.

7 Claims, No Drawings

GLASS COMPOSITIONS WITH LOW DIELECTRIC LOSSES

BACKGROUND OF THE INVENTION

This invention relates to essentially alkali-free PbO-, CaO-, MgO-, ZnO-, BaO-containing silicate-glasses with low $B_2O_3$ contents and higher additions of $Al_2O_3$ which have very low dielectric loss factors, tan δ, but at the same time have adequate acid-resistance and small thermal expansion coefficients. Such glasses are particularly well suited for use as insulators in ozone generation by silent corona discharges which are acquiring ever increasing importance for degermination or sterilization purposes, for example as applied to water or air. See, e.g., "Ozoneurs a tubes horizontaux," brochure of Welsbach Corporation, Degremont."

The ozone yield is the greater the smaller the dielectric losses in the glass (heating up of the glass). One measure of this effect is provided by the ratio (tan δ)/ε and, more specifically, ozone yield will be the higher the smaller this value. Considering that the applicable glasses in general have very similar ε-values, the tan δ-values are of critical significance.

SUMMARY OF THE INVENTION

It therefore is an object of this invention to provide a glass having properties improved for use as an insulator in such discharges, especially having low values of tan δ.

Upon further study of the specification and appended claims, further objects and advantages of this invention will become apparent to those skilled in the art.

These objects have been achieved by providing glasses with low dielectric losses, suitable, for example, for ozone-generation by silent electric discharge for sterilization purposes, for example of water and air, which are alkali-free, have thermal expansion coefficients in the temperature range from 20° to 300° C. of 3.15 to $4.97 \times 10^{-6}$/°C., are within the third class in the acid-resistance table according to DIN 12116, or better, and within the first class in the water stability table according to DIN 12111, or better, have $T_{k100}$ values of >500° C., dielectric constants (ε)—measured at 50 and 500 Hz, and at 20° and 70° C. in each case—of 5.95 to 7.02, dielectric loss factors (tan δ)—also measured at 50 and 500 Hz and at 20° and 70° C., respectively, of 3.94 to $24.9 \times 10^{-4}$, transformation temperatures (Tg) from 622° to 663° C., softening temperatures (Ew) from 849° to 898° C., processing temperatures ($V_A$) from 1132° to 1280° C., densities (D) from 2.69 to 2.992 g/cm³ and have analyses comprising the following, calculated as oxide weight percent:

$SiO_2$: 52.50 to 60.20
$B_2O_3$: 2.80 to 3.80
$Al_2O_3$: 8.00 to 14.00
PbO: 6.00 to 20.20
CaO: 2.00 to 13.50
MgO: 0 to 3.50
ZnO: 0 to 8.00
BaO: 0 to 4.70
PbO+CaO+MgO+ZnO+BaO: 21.10 to 34.00
F: 0 to 1.00
$Sb_2O_3$: 0.20 to 0.50 wherein the oxides not including $Sb_2O_3$ form 100% of the composition.

Preferred are such glasses which are essentially both alkali- and fluorine-free, have thermal expansion coefficients of $3.37$–$4.97 \times 10^{-6}$/°C. in the temperature range from 20°–300° C., dielectric constants (ε) of 6.40 to 7.02 measured, at 50 and 500 Hz and at 20° and 70° C. in each case, dielectric loss factors (tan δ) of $4.48$–$15.50 \times 10^{-4}$ also measured, at 50 and 500 Hz and at 20° and 70° C., transformation temperatures (Tg) of 640°–663° C., softening temperatures (Ew) of 849° to 890° C., processing temperatures ($V_A$) of 1132°–1204° C., densities (D) of from 2.84–2.992 g/cm³, and have analyses comprising the following, calculated in oxide weight percent:

|  | Weight Percent | | |
| --- | --- | --- | --- |
| $SiO_2$ | 52.50 | to | 55.70 |
| $B_2O_3$ | 3.00 | to | 3.80 |
| $Al_2O_3$ | 8.00 | to | 14.00 |
| PbO | 13.50 | to | 20.20 |
| CaO | 2.00 | to | 13.50 |
| MgO | 0 | to | 3.50 |
| ZnO | 0 | to | 8.00 |
| BaO | 0 | to | 4.70 |
| PbO + CaO + MgO + ZnO + BaO | 30.50 | to | 34.00 |
| $Sb_2O_3$ | 0.20 | to | 0.50 |

Preferred contents of the other oxides include for $Al_2O_3$: 10–14 wt. %; for CaO: 2–6.3 wt. % and 5.3–7.3 wt. %; for MgO: 1–3.5 wt. and 2–3 wt. %; for ZnO: 1–8 wt. %, 4–8 wt. % and 4.5–7.5 wt. %; and for BaO: 1–4.7 wt. % and 3–4.7 wt. %. $T_{K100}$ values are generally from >500° C. to about 605°–610° C. Conditions of measurement of Tg, Ew, $V_A$ and $T_{k100}$ are listed in the table below.

DETAILED DISCUSSION

The glasses of this invention are clearly superior in these important properties to the borosilicate glasses hitherto used for these applications, such as DURAN 50 type 8330 or KOVAR Glass, type 8250 made by SCHOTT GLASWERKE, of Mainz as will be evident from a comparison of corresponding values in Table 2.

A technological advance of the glasses according to this invention by comparison with hitherto used glasses can be seen to reside in the savings of energy and/or increased ozone yield which can be achieved with the new glasses in ozone generators.

Another important factor in regard to the usefulness and practical value of the glasses is their adequate resistance to temperature shocks which is assured by their low thermal expansion coefficient. This particular requirement arises from the necessity of internal metallization of the glass tubes by application of the flame- or plasma-spray-process.

Lastly, acid-resistance is also of considerable importance for the preferred special application envisaged for these glasses. In the presence of a damp atmosphere containing nitrogen, some nitric acid will be formed during the electric discharge. Obviously, the glasses must be sufficiently resistant to such acid attack. Experience has shown that this property will be achieved when glasses fall within the third acid class according to DIN 12116 and no worse. This requirement is satisfied by the glasses according to the invention. The tests of DIN 12116 and DIN 12111 are incorporated by reference herein. It is preferred that the glasses of this invention be completely alkali metal free; the upper tolerance for this component is 0.15 wt. % where its presence is unavoidable.

The glasses are prepared fully conventionally from melts of the oxides or precursor salts at conventional temperatures and using conventional glass-making equipment and considerations. For the examples, 140 kg of the mixed batch composition were melted in a 50 l capacity platinum crucible heated at 1580° C. Following melting, the glass was homogenized and refined at 1580° C. for 6-8 hours. The glass was then cooled to the working temperature of 1180° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

TABLE 1

16 Examples of glass composition in weight percent by comparison with the two SCHOTT-glasses types 8330 and 8250.

| Example No. | $SiO_2$ | $B_2O_3$ | $Al_2O_3$ | PbO | CaO | MgO | ZnO | BaO | F | $Sb_2O_3$ | percent total |
|---|---|---|---|---|---|---|---|---|---|---|---|
| 1 | 52.50 | 3.00 | 14.00 | 16.50 | 2.00 | 1.00 | 8.00 | 3.00 | | 0.20 | 100.20 |
| 2 | 52.50 | 3.50 | 14.00 | 16.00 | 2.00 | | 8.00 | 3.00 | 1.00 | 0.20 | 100.20 |
| 3 | 60.20 | 3.70 | 14.00 | 7.50 | 5.30 | | 5.50 | 2.80 | 1.00 | 0.30 | 100.30 |
| 4 | 60.20 | 2.80 | 14.00 | 6.00 | 6.30 | 2.00 | 4.00 | 3.70 | 1.00 | 0.30 | 100.30 |
| 5 | 58.70 | 2.80 | 14.00 | 6.00 | 6.30 | 2.00 | 4.50 | 4.70 | 1.00 | 0.30 | 100.30 |
| 6 | 58.00 | 3.50 | 14.00 | 6.00 | 6.30 | 2.00 | 4.50 | 4.70 | 1.00 | 0.30 | 100.30 |
| 7 | 55.70 | 2.80 | 10.00 | 13.50 | 6.30 | 1.50 | 4.50 | 4.70 | 1.00 | 0.30 | 100.30 |
| 8 | 55.70 | 3.80 | 10.00 | 13.50 | 6.30 | 1.50 | 4.50 | 4.70 | | 0.30 | 100.30 |
| 9 | 55.70 | 3.80 | 10.00 | 13.50 | 8.30 | | 4.50 | 4.20 | | 0.30 | 100.30 |
| 10 | 52.70 | 3.30 | 10.00 | 20.20 | 8.30 | | 5.50 | | | 0.30 | 100.30 |
| 11 | 55.20 | 3.80 | 10.00 | 13.50 | 6.30 | 2.50 | 4.50 | 4.20 | | 0.20 | 100.20 |
| 12 | 55.20 | 3.30 | 10.00 | 13.50 | 6.30 | 3.50 | 4.50 | 3.70 | | 0.20 | 100.20 |
| 13 | 55.20 | 3.30 | 8.00 | 16.00 | 6.30 | 2.50 | 4.50 | 4.20 | | 0.50 | 100.50 |
| 14 | 54.20 | 3.30 | 10.00 | 15.00 | 6.30 | 2.50 | 7.50 | 1.20 | | 0.20 | 100.20 |
| 15 | 54.20 | 3.30 | 10.00 | 18.70 | 6.30 | 2.50 | 5.00 | | | 0.20 | 100.20 |
| 16 | 54.20 | 3.80 | 10.00 | 16.00 | 13.50 | 2.50 | — | — | — | 0.15 | 100.15 |
| | | | | PbO | CaO | | | | | | |
| SCHOTT Duran 50 (8330) | 80.60 | 12.80 | 2.30 | 3.60 $Na_2O$ | 0.70 $K_2O$ | | | | | | 100.00 |
| SCHOTT Kovar (8250) | 69.20 | 18.50 | 2.60 | 0.60 $Li_2O$ | 7.70 $K_2O$ | | 0.60 | | | 0.05 $As_2O_3$ | 100.05 |

TABLE 2

Properties of Glasses according to Table 1.

| Properties | 1 | 2 | 3 | 4 | 5 | 6 | 7 | 8 | 9 | 10 | 11 | 12 | 13 | 14 | 15 | 16 | 8330 | 8250 |
|---|---|---|---|---|---|---|---|---|---|---|---|---|---|---|---|---|---|---|
| $\alpha \cdot 10^6$ (20-300° C.)/°C. | 3.37 | 3.15 | 3.33 | 3.75 | 3.90 | 3.92 | 4.27 | 4.17 | 4.32 | 4.22 | 4.29 | 4.29 | 4.39 | 4.10 | 4.08 | 4.97 | 3.25 | 5.00 |
| $T_g$(°C.); $\eta$ ca $10^{13.5}$ Poise | 653 | 622 | 656 | 659 | 657 | 655 | 622 | 650 | 652 | 642 | 649 | 655 | 638 | 644 | 640 | 663 | 530 | 492 |
| $E_w$(°C.); $\eta = 10^{7.6}$ Poise | 890 | 879 | | | 898 | | | | 872 | 856 | 870 | 867 | 862 | 849 | 851 | 884 | 815 | 715 |
| $V_A$(°C.); $\eta = 10^4$ P | 1204 | 1215 | 1280 | 1254 | 1237 | 1215 | 1168 | 1183 | 1184 | 1149 | 1174 | 1156 | 1160 | 1136 | 1151 | 1132 | 1270 | 1060 |
| $V_A$-$E_w$(°C.) | 314 | 336 | | | 339 | | | | 312 | 293 | 304 | 289 | 298 | 287 | 300 | 248 | 455 | 345 |
| Density (g/ccm) | 2.97 | 2.921 | | 2.69 | 2.731 | 2.731 | 2.904 | 2.891 | 2.884 | 2.992 | 2.892 | 2.898 | 2.956 | 2.951 | 2.963 | 2.84 | 2.23 | 2.28 |
| $T_k100$(°C.); $\rho = 10^8 \Omega \cdot cm$ | | | | | 591 | 600 | 591 | 603 | | | | | | | | | 248 | 384 |
| Dielectric constant $\epsilon$ at | | | | | | | | | | | | | | | | | | |
| 50 Hz and 20° C. | 6.88 | 6.48 | 5.95 | 6.39 | 6.60 | 6.55 | 6.44 | 6.40 | 6.55 | 6.84 | 6.56 | 6.61 | 6.76 | 6.56 | 6.58 | 6.88 | 5.11 | 6.18 |
| 70° C. | 6.88 | 6.55 | 5.95 | 6.39 | 6.60 | 6.55 | 6.51 | 6.46 | 6.55 | 6.84 | 6.63 | 6.68 | 6.76 | 6.63 | 6.58 | 6.95 | 5.18 | 6.47 |
| Loss factor tan $\delta \times 10^4$ at 50 Hz and | | | | | | | | | | | | | | | | | | |
| 20° C. | 9.6 | 16.00 | 11.10 | 8.53 | 5.90 | 3.94 | 4.63 | 7.50 | 5.65 | 4.63 | 5.05 | 5.35 | 4.78 | 4.48 | 5.30 | 5.52 | 103 | 157 |
| 70° C. | 12.8 | 24.9 | 12.10 | 10.4 | 8.28 | 6.88 | 6.20 | 12.60 | 15.50 | 14.1 | 7.12 | 8.40 | 7.18 | 5.85 | 5.55 | 6.00 | 300 | 597 |
| $\epsilon$ 500 20° C. | 6.88 | 6.48 | | | 6.60 | | | | 6.55 | 6.84 | 6.56 | 6.61 | 6.76 | 6.56 | 6.58 | 6.95 | 5.11 | 6.18 |
| Hz and 70° C. | 6.88 | 6.55 | | | 6.60 | | | | 6.55 | 6.84 | 6.63 | 6.68 | 6.76 | 6.63 | 6.58 | 7.02 | 5.18 | 6.47 |
| tan $\delta \times 10^4$ 20° C. at 500 Hz | 11.60 | 9.00 | | | 6.00 | | | | 6.50 | 5.50 | 6.00 | 6.25 | 5.35 | 6.00 | 5.50 | 5.30 | 85 | 107 |
| and 70° C. | 11.90 | 11.50 | | | 7.50 | | | | 12.00 | 12.00 | 6.75 | 8.50 | 6.90 | 6.50 | 6.25 | 6.60 | 166 | 300 |
| acid resistance DIN 12116 | 13 3.K1 | 15 3.K1 | 7.6 3.K1 | 3.5 3.K1 | 4.4 3.K1 | 8.0 3.K1 | 5.6 3.K1 | 5.9 3.K1 | 4.3 3.K1 | 6.7 3.K1 | 5.6 3.K1 | 4.2 3.K1 | 4.6 3.K1 | 8.0 3.K1 | 6.8 3.K1 | 7.3 3.K1 | 0.5 1.K1 | 45 4.K1 |
| Water stability DIN 12111 | 7 1.K1 | — | — | — | — | — | 10 1.K1 | 11 1.K1 | — | — | 17 1.K1 | 16 1.K1 | 1.K1 | | | | 8 1.K1 | 64 3.K1 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass consisting essentially of, in analysis oxide weight percent, $SiO_2$: 52.50 to 60.20
$B_2O_3$: 2.80 to 3.80
$Al_2O_3$: 8.00 to 14.00
PbO: 6.00 to 20.20
CaO: 2.00 to 13.50
MgO: 0 to 3.50
ZnO: 0 to 8.00
BaO: 0 to 4.70
PbO+CaO+MgO+ZnO+BaO: 21.10 to 34.00
F: 0 to 1.00
$Sb_2O_3$: 0.20 to 0.50 wherein 100 wt. % is exclusive of $Sb_2O_3$, and being essentially alkali metal-free and having the following properties: a thermal expansion coefficient in the temperature range from 20° to 300° C. of 3.15 to $4.97 \times 10^{-6}$/°C., an acid resistance whereby the glass falls within the third class or better in the acid-resistance table according to DIN 12116, a water stability whereby the glass falls within the first class or better in the water stability table according to DIN 12111, a $T_{k100}$ value of >500° C., a dielectric constant ($\epsilon$)—measured at 50 and 500 Hz in each case at 20° and 70° C.—of 5.95 to 7.02, a dielectric loss factor (tan $\delta$)—also measured at 50 and 500 Hz at 20° and 70° C. in each case—of 3.94 to $24.9 \times 10^{-4}$, a transformation temperature (Tg) of 622° to 663° C., a softening temperature (Ew) of 849° to 898° C., a processing temperature ($V_A$) of 1132° to 1280° C., and a density (D) of 2.69 to 2.992 g/cm$^3$.

2. A glass of claim 1 consisting essentially of, in analysis oxide weight percent, $SiO_2$: 52.50 to 55.70
$B_2O_3$: 3.00 to 3.80
$Al_2O_3$: 8.00 to 14.00
PbO: 13.50 to 20.20
CaO: 2.00 to 13.50
MgO: 0 to 3.50
ZnO: 0 to 8.00
BaO: 0 to 4.70
PbO+CaO+MgO+ZnO+BaO: 30.50 to 34.00
$Sb_2O_3$: 0.20 to 0.50 and being essentially alkali metal- and fluorine-free and having the following properties: a thermal expansion coefficient of $3.37-4.97 \times 10^{-6}$/°C. in the temperature range from 20°–300° C., a dielectric constant ($\epsilon$) of 6.40 to 7.02 measured at 50 and 500 Hz in each case at 20° and 70° C., and a dielectric loss factor (tan $\delta$) of $4.48-15.50 \times 10^{-4}$ also measured in each case at 50 and 500 Hz and at 20° and 70° C., a transformation temperature (Tg) of 640°–663° C., a softening temperature (Ew) of 849° to 890° C., a processing temperature ($V_A$) of 1132°–1204° C. and a density (D) from 2.84–2.992 g/cm$^3$.

3. A glass of claim 1 wherein the following amounts of oxides are contained: $Al_2O_3$: 10–14 wt. %; CaO: 2–6.3 wt. %; MgO: 1–3.5 wt. %; ZnO: 1–8 wt. %; and BaO: 1–4.7 wt. %.

4. A glass of claim 2 wherein the following amounts of oxides are contained: $Al_2O_3$: 10–14 wt. %; CaO: 2–6.3 wt. %; MgO: 1–3.5 wt. %; ZnO: 1–8 wt. %; and BaO: 1–4.7 wt. %.

5. A glass of claim 1 wherein the following amounts of oxides are contained: CaO: 5.3–7.3 wt. %; MgO: 2–3 wt. %; ZnO: 4–8 wt. %; and BaO: 3–4.7 wt. %.

6. A glass of claim 2 wherein the following amounts of oxides are contained: CaO: 5.3–7.3 wt. %; MgO: 2–3 wt. %; ZnO: 4–8 wt. %; and BaO: 3–4.7 wt. %.

7. A glass of claim 1 wherein the following amounts of oxides are contained: CaO: 5.3–7.3 wt%; MgO: 2–2.5 wt%; ZnO: 4–8 wt%; and BaO: 3–4.7 wt%.

* * * * *